(12) United States Patent  
Wakimoto

(10) Patent No.: US 12,230,814 B2
(45) Date of Patent: Feb. 18, 2025

(54) RECTANGULAR SECONDARY BATTERY AND ASSEMBLED BATTERY INCLUDING THE SAME

(71) Applicant: SANYO Electric Co., Ltd., Daito (JP)

(72) Inventor: Ryoichi Wakimoto, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 251 days.

(21) Appl. No.: 16/496,558

(22) PCT Filed: Mar. 20, 2018

(86) PCT No.: PCT/JP2018/010953
§ 371 (c)(1),
(2) Date: Sep. 23, 2019

(87) PCT Pub. No.: WO2018/180749
PCT Pub. Date: Oct. 4, 2018

(65) Prior Publication Data
US 2021/0104796 A1     Apr. 8, 2021

(30) Foreign Application Priority Data

Mar. 27, 2017  (JP) ................. 2017-060406

(51) Int. Cl.
*H01M 50/184*   (2021.01)
*H01M 50/147*   (2021.01)
(Continued)

(52) U.S. Cl.
CPC ......... *H01M 50/184* (2021.01); *H01M 50/15* (2021.01); *H01M 50/176* (2021.01);
(Continued)

(58) Field of Classification Search
CPC . H01M 50/10–184; H01M 50/20–209; H01M 50/172; H01M 50/183–188
See application file for complete search history.

(56) References Cited

U.S. PATENT DOCUMENTS 9,634,299 B2 *  4/2017  Kim ................... H01M 50/578
2010/0081048 A1  4/2010  Nansaka et al.
(Continued)

FOREIGN PATENT DOCUMENTS

CN  102569683 A  7/2012
CN  102859747 A  1/2013
(Continued)

OTHER PUBLICATIONS

EPO machine translation of JP 2002343315 originally published to Azema Tadamitsu on Nov. 29, 2002 (Year: 2002).*

(Continued)

*Primary Examiner* — Jonathan G Jelsma
*Assistant Examiner* — Niara Trant
(74) *Attorney, Agent, or Firm* — WHDA, LLP

(57) ABSTRACT

A rectangular secondary battery including a sealing plate. The sealing plate has a first fitting recess that is nearer than a positive electrode terminal attachment hole to a center of the sealing plate and a second fitting recess that is nearer than the positive electrode terminal attachment hole to an end portion of the sealing plate. The first fitting recess and the second fitting recess are disposed at positions that are displaced from the center of the sealing plate in a transversal direction of the sealing plate. A first fitting protrusion and a second fitting protrusion of a second outer insulator are respectively disposed in the first fitting recess and the second fitting recess.

11 Claims, 10 Drawing Sheets

(51) Int. Cl.
  *H01M 50/15*   (2021.01)
  *H01M 50/176*  (2021.01)
  *H01M 50/188*  (2021.01)
  *H01M 50/209*  (2021.01)

(52) U.S. Cl.
  CPC ....... *H01M 50/188* (2021.01); *H01M 50/209* (2021.01); *H01M 50/147* (2021.01)

(56) References Cited

U.S. PATENT DOCUMENTS

| | | | |
|---|---|---|---|
| 2010/0233528 A1* | 9/2010 | Kim | H01M 50/564 |
| | | | 429/178 |
| 2012/0148910 A1 | 6/2012 | Kambayashi et al. | |
| 2013/0071728 A1 | 3/2013 | Shibanuma et al. | |
| 2017/0373303 A1* | 12/2017 | Ito | H01G 11/82 |
| 2018/0175334 A1* | 6/2018 | Muroya | H01M 50/15 |

FOREIGN PATENT DOCUMENTS

| | | | |
|---|---|---|---|
| CN | 205388985 U | * | 7/2016 |
| JP | 2002-343315 A | | 11/2002 |
| JP | 2010-80355 A | | 4/2010 |
| JP | 2010-282847 A | | 12/2010 |
| JP | 2011-216243 A | | 10/2011 |
| JP | 2013-206713 A | | 10/2013 |
| JP | 2018-55884 A | | 4/2018 |

OTHER PUBLICATIONS

Google English Machine Translation of CN205388985U originally published to Chi Qingkui on Jul. 20, 2016 (Year: 2016).*
International Search Report dated Jun. 19, 2018, issued in counterpart application No. PCT/JP2018/010953, with English translation. (4 pages).
English Translation of Office Action dated Sep. 15, 2021, issued in counterpart CN Application No. 201880014575.5. (4 pages).

* cited by examiner

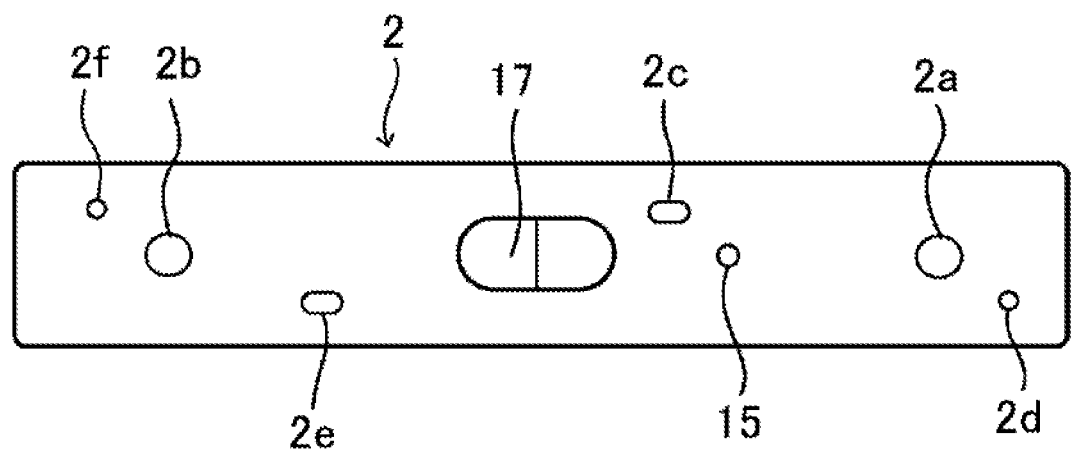
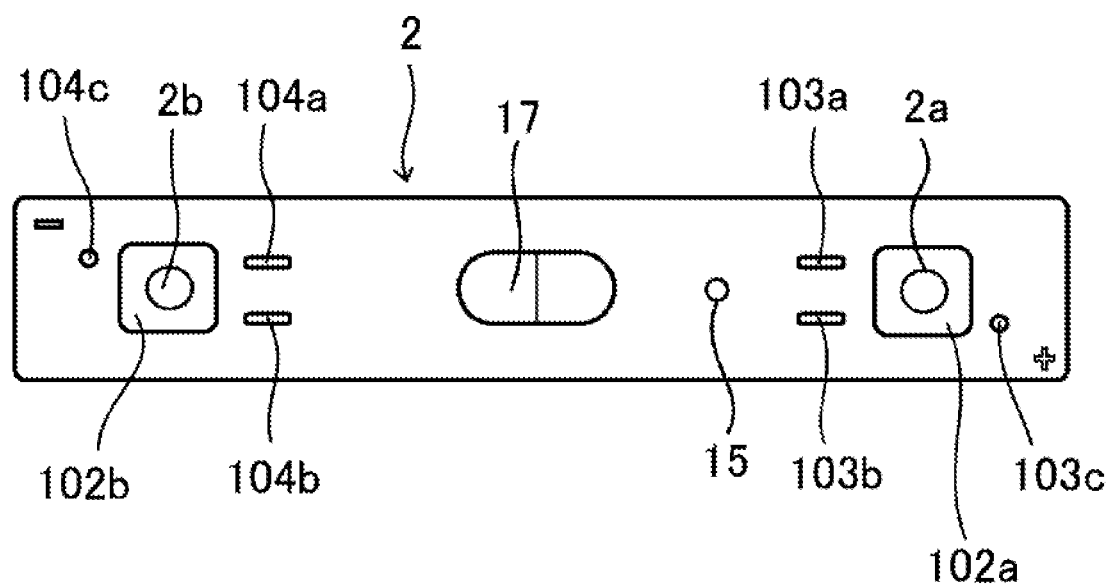

RECTANGULAR SECONDARY BATTERY AND ASSEMBLED BATTERY INCLUDING THE SAME

TECHNICAL FIELD

The present invention relates to a rectangular secondary battery and an assembled battery including the rectangular secondary battery.

BACKGROUND ART

An assembled battery in which a plurality of rectangular secondary batteries are connected in series or in parallel are used as electric power sources for driving electric automobiles (EV), hybrid electric automobiles (HEV, PHEV), and the like.

The rectangular secondary batteries each have a battery case that is composed of a bottomed rectangular casing that has an opening and a sealing plate that seals the opening. The battery case contains, as well as an electrolyte, an electrode body that is composed of a positive electrode plate, a negative electrode plate, and a separator. A positive electrode terminal and a negative electrode terminal are attached to the sealing plate. The positive electrode terminal is electrically connected to the positive electrode plate via a positive electrode current collector, and the negative electrode terminal is electrically connected to the negative electrode plate via a negative electrode current collector.

A rectangular secondary battery in which a positive electrode outer conductor and a negative electrode outer conductor are connected, outside of a battery case, respectively to a positive electrode terminal and a negative electrode terminal is known. An assembled battery made by using such rectangular secondary batteries is also known. In such an assembled battery, for example, it is possible to connect the positive electrode outer conductor of one of the rectangular secondary batteries and the negative electrode outer conductor of an adjacent one of the rectangular secondary batteries to each other via a busbar that is made of metal.

In a case where a rectangular secondary battery includes a positive electrode cuter conductor and a negative electrode outer conductor, an outer insulator is disposed between the positive electrode outer conductor and a sealing plate, and an outer insulator is disposed between the negative electrode outer conductor and the sealing plate. Thus, it is possible to prevent the positive electrode outer conductor and the negative electrode outer conductor from directly contacting each other.

In order to prevent the positive electrode outer conductor, the negative electrode outer conductor, or the outer insulators from becoming displaced with respect to the sealing plate due to shock, vibration, or the like, a technology for fitting the outer insulators and the sealing plate to each other is proposed (PTL 1).

CITATION LIST

Patent Literature

PTL 1: Japanese Published Unexamined Patent Application No. 2011-216243

SUMMARY OF INVENTION

Technical Problem

An object of the present invention is to provide a rectangular secondary battery that prevents an outer insulator, which is disposed between a positive electrode outer conductor or a negative electrode outer conductor and a sealing plate, from becoming displaced with respect to the sealing plate, and to provide an assembled battery including the rectangular secondary battery.

Solution to Problem

A rectangular secondary battery according to an aspect of the present invention includes an electrode body that includes a positive electrode plate and a negative electrode plate, a rectangular casing that has an opening and contains the electrode body, a sealing plate that has a terminal attachment hole and seals the opening, a terminal that is electrically connected to the positive electrode plate or the negative electrode plate and inserted into the terminal attachment hole, an outer conductor that is connected to the terminal on an outer side of the sealing plate, and an outer insulator that is disposed between the outer conductor and the sealing plate. The sealing plate has a first fitting recess and a second fitting recess. In a longitudinal direction of the sealing plate, the first fitting recess is disposed nearer than the terminal attachment hole to a center of the sealing plate, and the second fitting recess is disposed nearer than the terminal attachment hole to an end portion of the sealing plate. In a transversal direction of the sealing plate, the first fitting recess is displaced from the center of the sealing plate toward an end portion of the sealing plate, and the second fitting recess is displaced from the center of the sealing plate toward an end portion of the sealing plate. The outer insulator has a first fitting protrusion and a second fitting protrusion, the first fitting protrusion is disposed in the first fitting recess, and the second fitting protrusion is disposed in the second fitting recess.

In the rectangular secondary battery according to the aspect of the present invention, a surface of the sealing plate outside the battery has the first fitting recess and the second fitting recess. The first fitting protrusion and the second fitting protrusion of the outer insulator are respectively disposed in the first fitting recess and the second fitting recess. Therefore, it is possible to suppress displacement of the cuter insulator with respect to the sealing plate. Moreover, in the rectangular secondary battery according to the aspect of the present invention, in the longitudinal direction of the sealing plate, the first fitting recess is disposed on one side of the terminal attachment hole, and the second fitting recess are disposed on the other side of the terminal attachment hole. Therefore, the first fitting recess and the second fitting recess can be separated from each other by a large distance. Therefore, it is possible to more effectively suppress displacement of the outer insulator with respect to the sealing plate.

By preventing the outer insulator from becoming displaced with respect to the sealing plate, it is possible to reliably prevent the outer conductor and the sealing plate from contacting each other in an unintended state. Moreover, it is possible to prevent a connection portion between the outer conductor and the terminal or the like from being damaged due to an excessive load applied to the connection portion between the outer conductor and the terminal or the like.

Preferably, the outer conductor is held by the outer insulator. With such a structure, it is possible to more effectively suppress displacement of the outer conductor with respect to the sealing plate. For example, preferably, the outer insulator has a shape that allows the outer conductor to be fitted with the outer conductor.

In the rectangular secondary battery according to the aspect of the present invention, in the transversal direction of the sealing plate, the first fitting recess is displaced from the center of the sealing plate toward an end portion of the sealing plate, and the second fitting recess is displaced from the center of the sealing plate toward an end portion of the sealing plate. Therefore, it is possible to suppress decrease of the strength of the sealing plate, which may occur if the recesses are concentrated in a central portion of the sealing plate in the transversal direction. If the strength of the sealing plate decreases, the sealing plated easily deforms when pressure in the battery case increases. If the sealing plate deforms easily, the deformation may cause damage or breakage of a connection portion between the sealing plate and the rectangular casing, damage or breakage of a gas valve disposed in the sealing plate, or damage or breakage of a sealing portion of an electrolyte injection hole formed in the sealing plate.

Preferably, the sealing plate has a third fitting recess; in the longitudinal direction of the sealing plate, the third fitting recess is disposed nearer than the terminal attachment hole to the center of the sealing plate; in the transversal direction of the sealing plate, the third fitting recess is displaced from the center of the sealing plate toward an end portion of the sealing plate on a side where the first fitting recess is not disposed; and the outer insulator has a third fitting protrusion, and the third fitting protrusion is disposed in the third fitting recess.

With such a structure, it is possible to more effectively prevent displacement of the outer insulator with respect to the sealing plate while suppressing decrease of the strength of the sealing plate.

Preferably, a length of the first fitting recess in the longitudinal direction of the sealing plate is larger than a length of the first fitting recess in the transversal direction of the sealing plate.

With such a structure, it is possible to more effectively prevent displacement of the outer insulator with respect to the sealing plate while suppressing decrease of the strength of the sealing plate.

Preferably, a shape of the second fitting recess in plan view is a circular shape.

With such a structure, the sealing plate and the outer insulator can be fitted to each other in a more preferable state.

Preferably, a length of the third fitting recess in the longitudinal direction of the sealing plate is larger than a length of the third fitting recess in the transversal direction of the sealing plate.

With such a structure, it is possible to more effectively prevent displacement of the outer insulator with respect to the sealing plate while suppressing decrease of the strength of the sealing plate.

An assembled battery can be formed by using a plurality of the rectangular secondary batteries described above. In this case, the outer conductor of one of the rectangular secondary batteries and the outer conductor of an adjacent one of the rectangular secondary batteries are electrically connected to each other via a busbar made of a metal. In a case where the adjacent rectangular secondary batteries are connected in parallel, a plurality of outer conductors that are connected to each other via the busbar have the same polarity. In a case where the adjacent rectangular secondary batteries are connected in series, one of two outer conductors that are connected to each other via the busbar has the positive polarity, and the other of the outer conductors has the negative polarity.

Advantageous Effects of Invention

With the present invention, it is possible to provide a rectangular secondary battery in which displacement of an outer insulator with respect to a sealing plate is suppressed and that has high reliability, and to provide an assembled battery including the rectangular secondary battery.

BRIEF DESCRIPTION OF DRAWINGS

FIG. 13A illustrates a surface of the sealing plate inside the battery before the components are attached. FIG. 13B illustrates a surface of the sealing plate outside the battery before the components are attached.

DESCRIPTION OF EMBODIMENTS

The structure of a rectangular secondary battery 20 according to an embodiment will be described below. The present invention is not limited to the embodiment described below.

Figure 1:
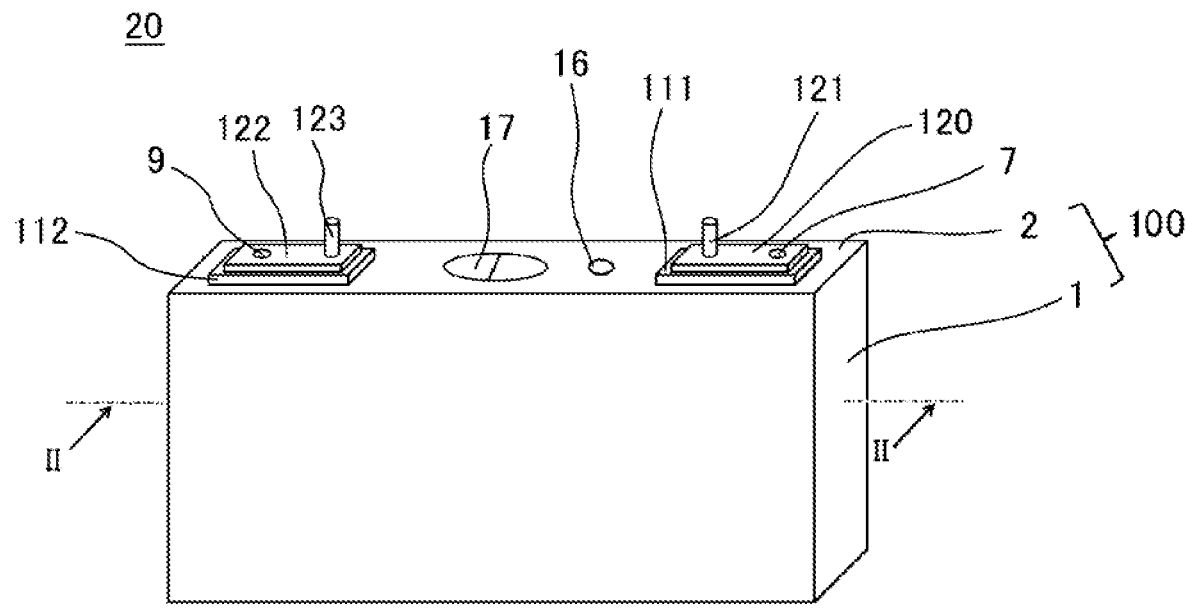
FIG. 1 is a perspective view of a rectangular secondary battery according to an embodiment.
Figure 2:
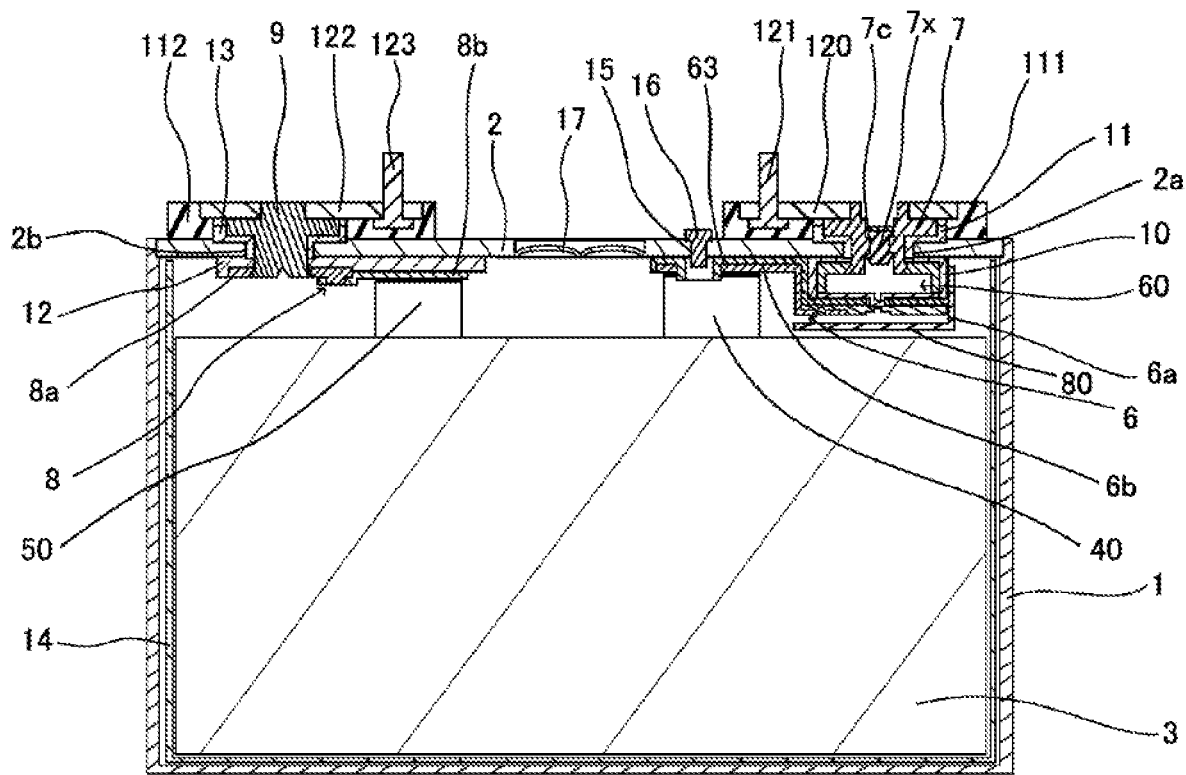
FIG. 2 is a sectional view taken along line II-II in FIG. 1.

As illustrated in FIGS. 1 and 2, the rectangular secondary battery 20 includes a battery case 100 that is composed of a rectangular casing 1, which has a bottomed angular-tube-like shape having an opening, and a sealing plate 2, which seals the opening of the rectangular casing 1. Preferably, the rectangular casing 1 and the sealing plate 2 are each made of a metal such as aluminum or an aluminum alloy. The rectangular casing 1 contains, as well as an electrolyte, a stacked electrode body 3, in which a positive electrode plate and a negative electrode plate are stacked with a separator interposed therebetween. An insulation sheet 14, which is made of a resin, is disposed between the electrode body 3 and the rectangular casing 1.

A positive electrode tab 40 and a negative electrode tab 50 are provided on an end portion of the electrode body 3 adjacent to the sealing plate 2. The positive electrode tab 40 is electrically connected to a positive electrode terminal 7 via a second positive electrode current collector 6b and a first positive electrode current collector 6a. The negative electrode tab 50 is electrically connected to a negative electrode terminal 9 via a second negative electrode current collector 8b and a first negative electrode current collector 8a. Here, the first positive electrode current collector 6a and the second positive electrode current collector 6b constitute a positive electrode current collector member 6. The first negative electrode current collector 8a and the second negative electrode current collector 8b constitute a negative electrode current collector member 8. The positive electrode current collector member 6 nay be a single component. The negative electrode current collector member 8 may be a single component.

The positive electrode terminal 7 is fixed to the sealing plate 2 with a first outer insulator 11 made of a resin interposed therebetween. The negative electrode terminal 9 is fixed to the sealing plate 2 with a first outer insulator 13 made of a resin interposed therebetween. The positive electrode terminal 7 is preferably made of a metal, and more preferably made of aluminum or an aluminum alloy. The negative electrode terminal 9 is preferably made of a metal, and more preferably made of copper or a copper alloy. The negative electrode terminal 9 may have a part that is made of aluminum or aluminum and a part that is made of copper or a copper alloy, and the part made of copper or a copper alloy may be disposed inside the battery.

Preferably, a circuit breaker mechanism 60, which operates when the pressure in the battery case 100 becomes a predetermined pressure or higher to block the conduction path between the positive electrode plate and the positive electrode terminal 7, is disposed in a conduction path between the positive electrode plate and the positive electrode terminal 7. A circuit breaker mechanism may be disposed in a conduction path between the negative electrode plate and the negative electrode terminal 9. The circuit breaker mechanism 60 may be omitted.

The sealing plate 2 has a gas discharge valve 17 that breaks when the pressure in the battery case 100 becomes a predetermined pressure or higher to discharge gas in the battery case 100 to the outside of the battery case 100. The operation pressure of the gas discharge valve 17 is set higher than the operation pressure of the circuit breaker mechanism 60.

The sealing plate 2 has an electrolyte injection hole 15. After injecting an electrolyte into the battery case 100 from the electrolyte injection hole 15, the electrolyte injection hole 15 is sealed with a sealing plug 16. Preferably, a blind rivet is used as the sealing plug 16.

An outer conductor 120 on the positive electrode side, which is made of a metal, is connected the positive electrode terminal 7 at a position that is further outward from the sealing plate 2 with respect to the battery. A fastening member 121 is connected to the outer conductor 120 The fastening member 121 may be emitted. A second outer insulator 111 on the positive electrode side is disposed between the outer conductor 120 and the sealing plate 2.

An outer conductor 122 on the negative electrode side, which is made of a metal, is connected the negative electrode terminal 9 at a position that is further outward from the sealing plate 2 with respect to the battery. A fastening member 123 is connected to the outer conductor 122 The fastening member 123 may be omitted. A second outer insulator 112 on the negative electrode side is disposed between the outer conductor 122 and the sealing plate 2.

Preferably, the outer conductor 120 and the outer conductor 122 are each made of aluminum, an aluminum alloy, copper, a copper alloy, or the like. The surfaces may be plated with nickel or the like. Preferably, the second outer insulator 111 and the second outer insulator 112 are each made of a resin.

Next, a method of manufacturing the rectangular secondary battery 20 and details of each component will be described.

Making of Positive Electrode Plate

A positive electrode slurry, which includes a lithium nickel cobalt manganese composite oxide as a positive electrode active material, polyvinylidene fluoride (PVdF) as a binder, a carbon material as a conductive agent, and an N-methyl-2-pyrrolidone (NMP) as a dispersion medium, is made. The positive electrode slurry is applied to both surfaces of a rectangular aluminum foil, having a thickness of 15 μm, as a positive electrode core. NMP in the positive electrode slurry is removed by drying this, thereby forming positive electrode active material mixture layers on the positive electrode core. Subsequently, the positive electrode active material mixture layers are each compressed so as to have a predetermined thickness. A positive electrode plate obtained in this way is cut into a predetermined shape.

Figure 3:
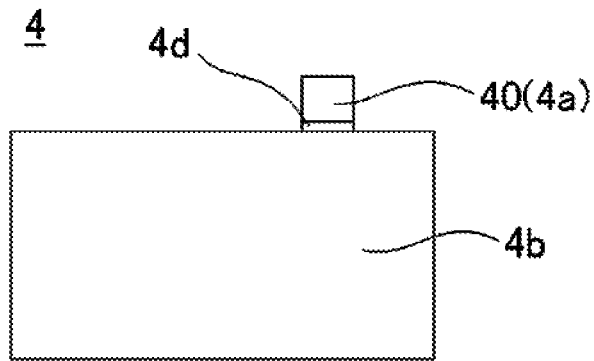
FIG. 3 is a plan view of a positive electrode plate according to the embodiment.

As illustrated in FIG. 3, a positive electrode plate 4 has a body in which positive electrode active material mixture layers 4b are formed on both surfaces of a rectangular positive electrode core 4a. The positive electrode core 4a protrudes from an edge of the body, and the protruding positive electrode core 4a constitutes the positive electrode tab 40. Preferably, a positive electrode protection layer 4d, which has higher electric resistance than the positive electrode active material mixture layers 4b, is formed on a part of the positive electrode tab 40 adjacent to the positive electrode active material mixture layers 4b.

Making of Negative Electrode Plate

A negative electrode slurry, which includes carbon black as a negative electrode active material, a styrene-butadiene rubber (SBR) as a binder, carboxymethylcellulose (CMC) as a thickener, and water, is made. The negative electrode slurry is applied to both surfaces of a rectangular copper foil, having a thickness of 8 μm, as a negative electrode core. Water in the positive electrode slurry is removed by drying this, thereby forming negative electrode active material mixture layers on the negative electrode core. Subsequently, the negative electrode active material mixture layers are each compressed so as to have a predetermined thickness. The negative electrode plate obtained in this way is cut into a predetermined shape.

Figure 4:
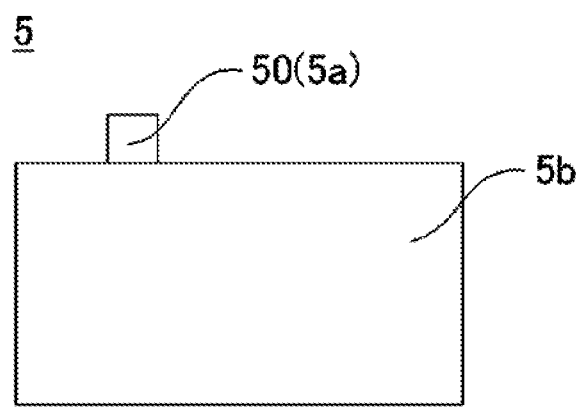
FIG. 4 is a plan view of a negative electrode plate according to the embodiment.

FIG. 4 is a plan view of a negative electrode plate 5 made by using the method described above. As illustrated in FIG. 4, the negative electrode plate 5 has a body in which negative electrode active material mixture layers 5b are formed on both surfaces of a rectangular negative electrode core 5a. The negative electrode core 5a protrudes from an edge of the body, and the protruding negative electrode core 5a constitutes the negative electrode tab 50.

Making of Electrode Body Element

Figure 5:
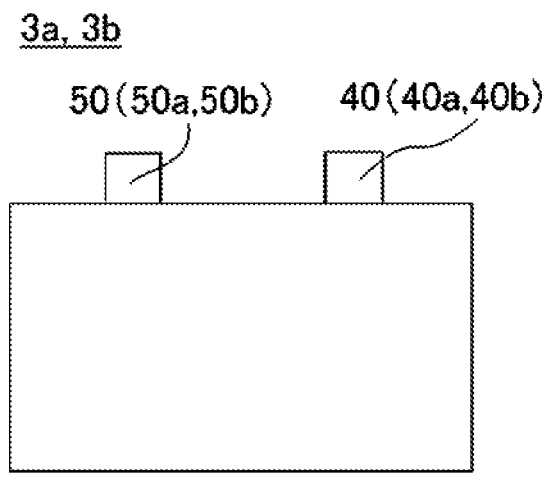
FIG. 5 is a plan view of an electrode body element according to the embodiment.

Fifty positive electrode plates 4 and fifty-one negative electrode plates 5 are made by using the method described above, and a stacked electrode body element (3a, 3b) is made by stacking these plates with rectangular separators made of polyolefin interposed therebetween. As illustrated in FIG. 5, the stacked electrode body element (3a, 3b) is made so that, at one end portion thereof, the positive electrode tabs 40 of the positive electrode plates 4 are stacked and the negative electrode tabs 50 of the negative electrode plates 5 are stacked.

Attachment of Components to Sealing Plate (Positive Electrode Side)

Figure 6:
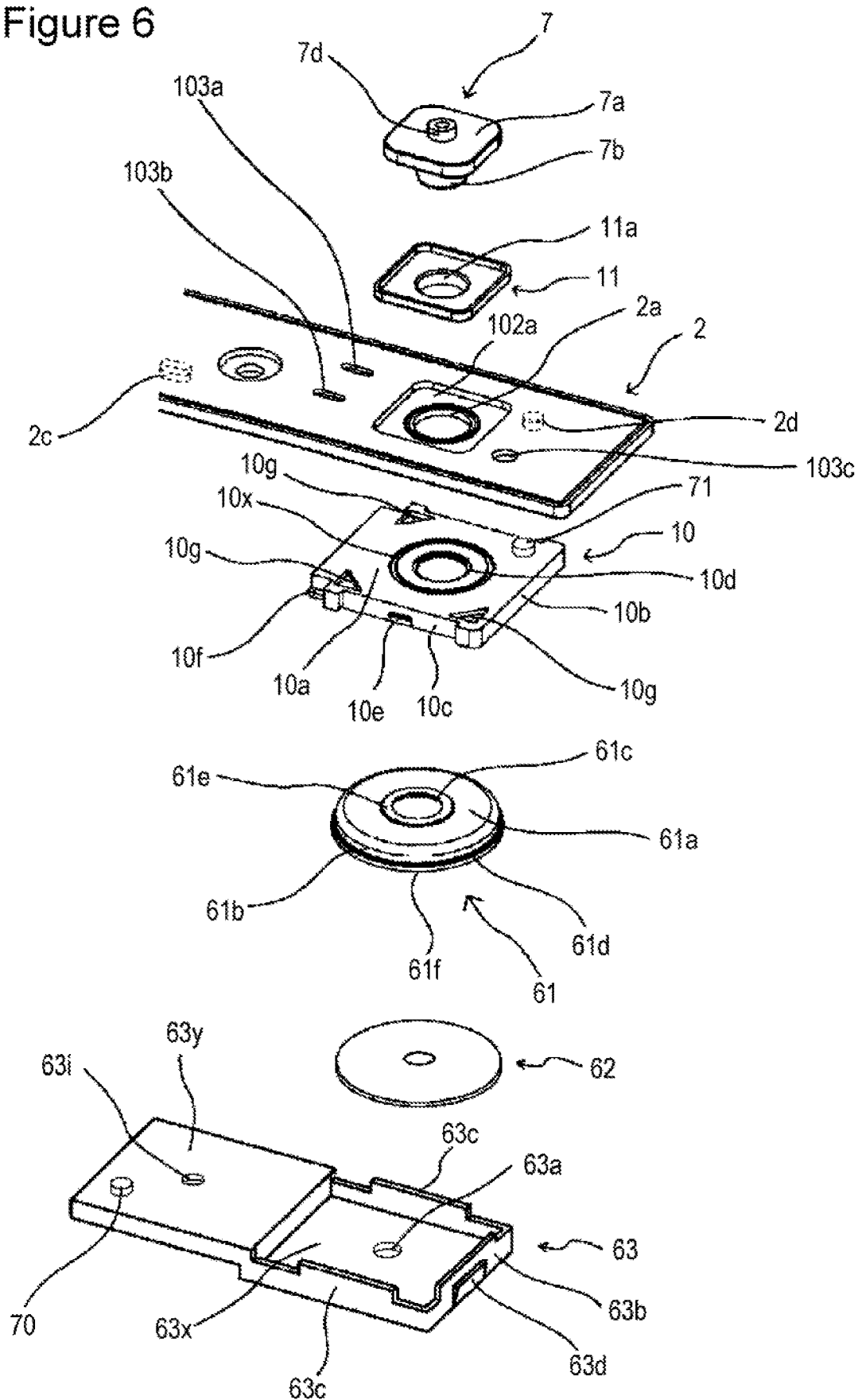
FIG. 6 is a perspective view of a positive electrode terminal, a first outer insulator, a sealing plate, a first insulator, a conductor, a deformable plate, and a second insulator before being assembled.
Figure 7:
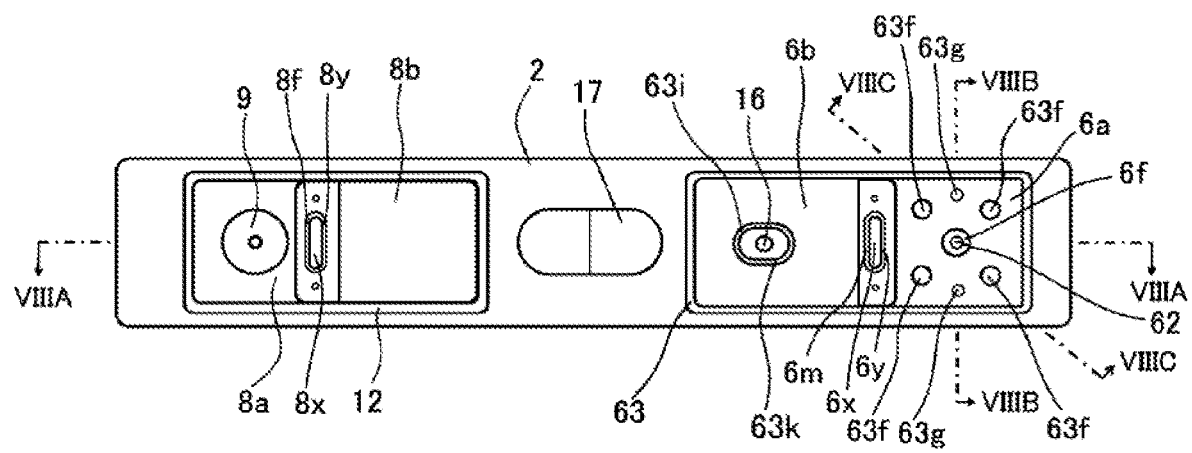
FIG. 7 illustrates a surface of the sealing plate inside the battery after the components have been attached.

Referring to FIGS. 2 and 6 to 8, a method of attaching the positive electrode terminal 7, the first positive electrode current collector 6a, and the like to the sealing plate 2, and the structure of a portion near the positive electrode terminal 7 will be described. In FIG. 7, the positive electrode tab 40 and the negative electrode tab 50 are not illustrated.

The first outer insulator 11 is placed on the surface of the sealing plate 2 outside the battery near a positive electrode terminal attachment hole 2a, and a first insulator 10 and a conductor 61 are placed on a surface of the sealing plate 2 inside the battery near the positive electrode terminal attachment hole 2a. Next, an insertion portion 7b of the positive electrode terminal 7, which is formed on one side of a flange 7a, is inserted into each of a first terminal insertion hole 11a of the first outer insulator 11, the positive electrode terminal attachment hole 2a of the sealing plate 2, a second terminal insertion hole 10d of the first insulator 10, and a third terminal insertion hole 61c of the conductor 61. Then, the tip of the insertion portion 7b is upset on the conductor 61. Thus, the positive electrode terminal 7, the first outer insulator 11, the sealing plate 2, the first insulator 10, and the conductor 61 are fixed. Preferably, the upset part of the insertion portion 7b of the positive electrode terminal 7 and the conductor 61 are welded to each other by laser welding or the like. Preferably, the first insulator 10 and the first outer insulator 11 are each made of a resin.

As illustrated in FIGS. 6 and 8, the first insulator 10 has a first insulator body 10a that is disposed so as to face the sealing plate 2. A pair of first side walls 10b are disposed at both end portions of the first insulator body 10a in the longitudinal direction of the sealing plate 2. A pair of second side walls 10c are disposed at both end portions of the first insulator body 10a in the transversal direction of the sealing plate 2. The first insulator body 10a has the second terminal insertion hole 10d. First connection portions 10e are disposed on outer surfaces of the second side walls 10c. Preferably, the first connection portions 10a are disposed at central portions of the second side walls 10c in the longitudinal direction of the sealing plate 2. Second connection portions 10f are disposed on the outer surfaces of the second side walls 10c. Preferably, the second connection portions 10f are disposed at end portions of the second side walls 10c in the longitudinal direction of the sealing plate 2. A surface of the first insulator body 10a on the sealing plate 2 side has a first groove 10x, and a surface of the first insulator body 10a on the conductor 61 side has a second groove 10y. The second groove 10y is located further outward than the first groove 10x. The surface of the first insulator body 10a on the sealing plate 2 side has recesses 10g at corners thereof.

As illustrated in FIGS. 6 and 8, the conductor 61 has a conductor base 61a, which is disposed so as to face the first insulator body 10a, and a tubular portion 61b, which extends from the edge of the conductor base 61a toward the electrode body 3. The cross-sectional shape of the tubular portion 61b parallel to the sealing plate 2 may be a circular shape or a polygonal shape. A flange 61d is disposed at an end portion of the tubular portion 61b on the electrode body 3 side. The tubular portion 61b has a conductor opening 61f at an end portion thereof on the electrode body 3 side. A pressing protrusion 61e protrudes from a surface of the conductor base 61a that faces the first insulator 10. The pressing protrusion tie presses the first insulator 10 toward the sealing plate 2. Preferably, the pressing protrusion 61e is formed at the edge of the third terminal insertion hole 61c or near the edge.

Next, a deformable plate 62 is placed so as to close the conductor opening 61f of the conductor 61, and the edge of the deformable plate 62 is welded to the conductor 61 by laser welding or the like. Thus, the conductor opening 61f of the conductor 61 is tightly sealed by the deformable plate 62. The conductor 61 and the deformable plate 62 are each preferably made of a metal, and more preferably made of aluminum or an aluminum alloy.

Figure 9A:
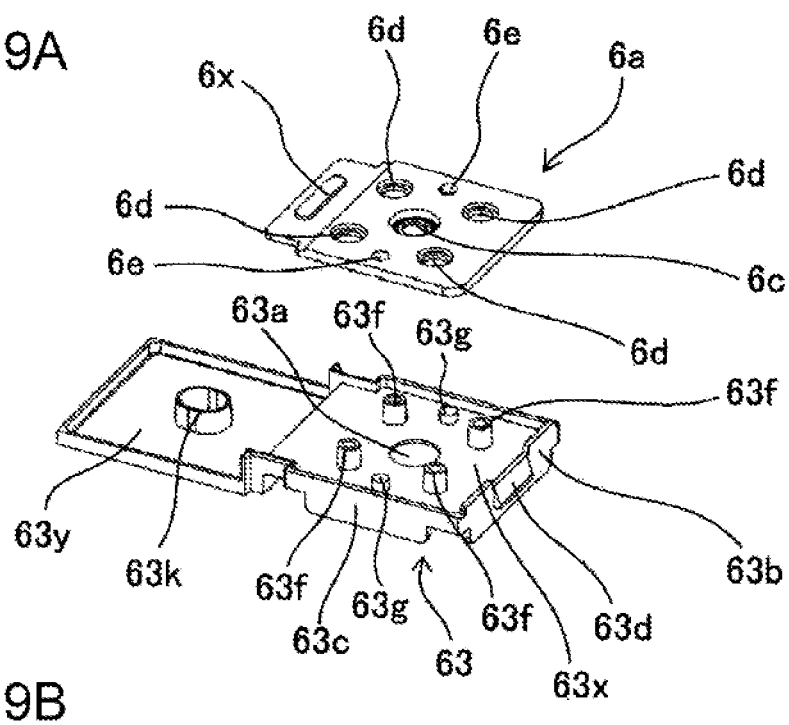
FIG. 9A is perspective view of a first positive electrode current collector and the second insulator before being assembled.
Figure 9B:
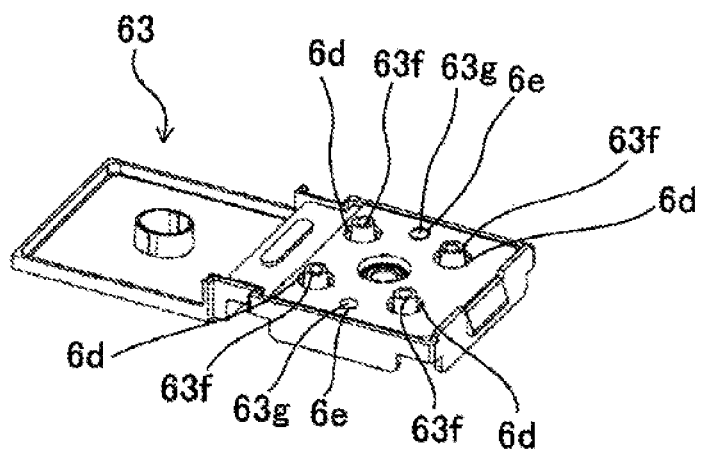
FIG. 9B is perspective view of the first positive electrode current collector and the second insulator after having been assembled.
Figure 9C:
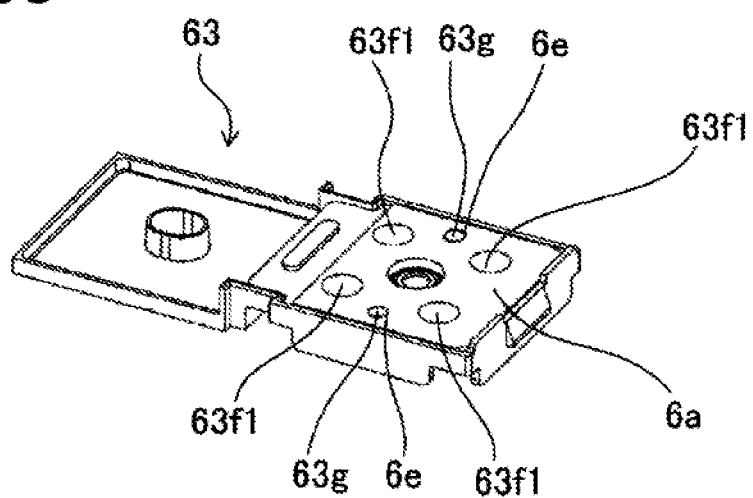
FIG. 9C is a perspective view of the first positive electrode current collector and the second insulator after having been fixed.

Next, referring to FIGS. 9A to 9C, a method of fixing a second insulator 63 and the first positive electrode current collector 6a will be described. In FIGS. 9A to 9C, a surface disposed on the electrode body 3 side in the rectangular secondary battery 20 is located at an upper position, and a surface disposed on the sealing plate 2 side is located at a lower position.

As illustrated in FIG. 9A, the first positive electrode current collector 6a has a connection hole 6c. The edge of the connection hole 6c is welded to the deformable plate 62. The first positive electrode current collector 6a has four fixing holes 6d around the connection hole 6c. The first positive electrode current collector 6a has displacement prevention holes 6e around the connection hole 6c. Preferably, the fixing holes 6a each has a small-diameter portion 6d1 and a large-diameter portion 6d2 whose inside diameter is larger than that of the small-diameter portion 6d1.

Figure 8A:
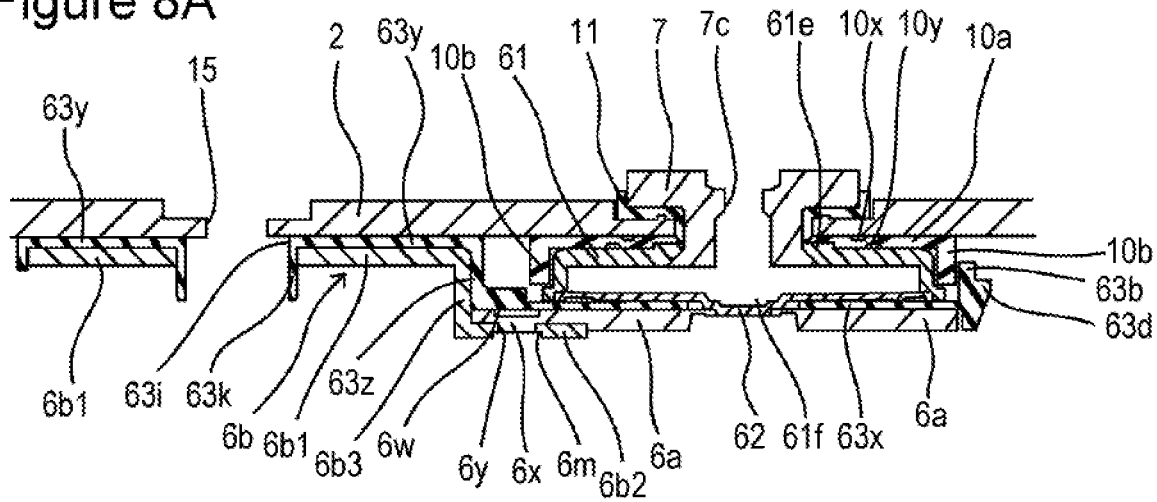
FIG. 8A is a sectional view taken along line VIIIA-VIIIA in FIG. 7.

As illustrated in FIGS. 8A and 9A, the second insulator 63 has an insulator first region 63x that is disposed so as to face the deformable plate 62, an insulator second region 63y that is disposed so as to face the sealing plate 2, and an insulator third region 63z that connects the insulator first region 63x and the insulator second region 63y. The insulator first region 63x has an insulator first opening 63a at the center thereof. A third wall portion 63b is disposed at an end portion of the insulator first region 63x in the longitudinal direction of the sealing plate 2. A third connection portion 63d is formed on the third wall portion 63b. Fourth wall portions 63c are disposed at both end portions of the insulator first region 63x in the transversal direction of the sealing plate 2. Fourth connection portions 63e are formed on the fourth wall portions 63c. Four claw portions 63h are formed on a surface of the insulator first region 63x on the sealing plate 2 side. The insulator second region 63y has an insulator second opening 63i at a position facing the electrolyte injection hole 15 of the sealing plate 2. An insulator annular rib 63k, which extends toward the electrode body 3, is disposed at the edge of the insulator second opening 63i.

As illustrated in FIG. 9B, the first positive electrode current collector 6a is placed on the second insulator 63 so that fixing protrusions 63f of the second insulator 63 are placed in the fixing holes 6d of the first positive electrode current collector 6a and the displacement prevention protrusions 63g of the second insulator 63 are placed in the displacement prevention holes 6e of the first positive electrode current collector 6a. The tips of the fixing protrusions 63f of the second insulator 63 are deformed by thermally upsetting these tips. Thus, as illustrated in FIGS. 8C and 9C, enlarged-diameter portions 63f1 are formed at the tips of the fixing protrusions 63f of the second insulator 63, and the second insulator 63 and the first positive electrode current collector 6a are fixed.

Preferably, as illustrated in FIG. 9C, the enlarged-diameter portions 63f1, which are formed at the tips of the fixing protrusions 63f of the second insulator 63, are disposed in the large-diameter portions 6d2 of the fixing holes 6d. The displacement prevention protrusions 63g of the second insulator 63 are not thermally upset, in contrast to the fixing protrusions 63f.

Figure 8B:
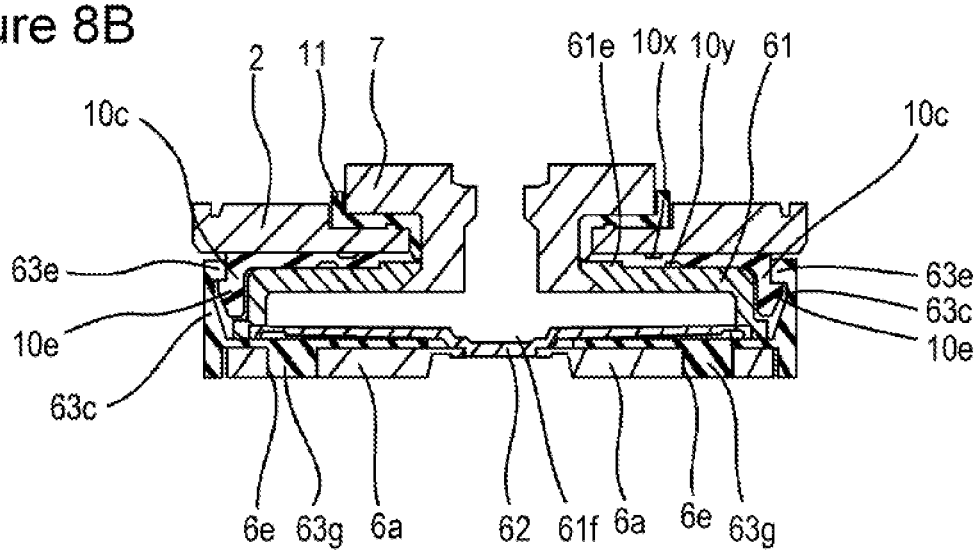
FIG. 8B is a sectional view taken along line VIIIB-VIIIB in FIG. 7.
Figure 8C:
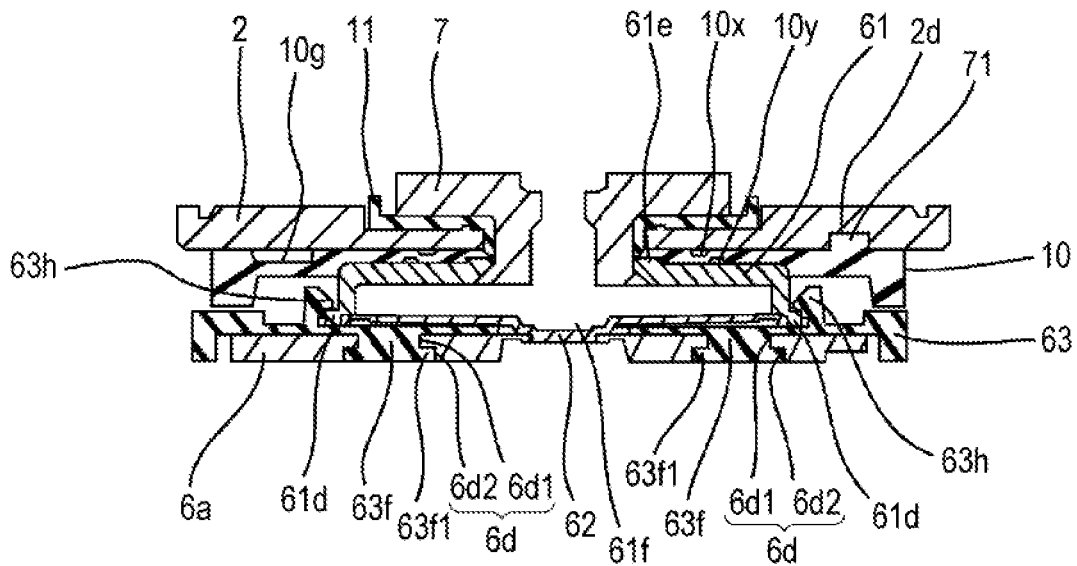
FIG. 8C is a sectional view taken along line VIIIC-VIIIC in FIG. 7.

Next, as illustrated in FIGS. 8A to 8C, the second insulator 63, to which the first positive electrode current collector 6a has been fixed, is connected to the first insulator 10 and the conductor 61.

As illustrated in FIG. 8B, the fourth connection portions 63e of the second insulator 63 are connected to the first connection portions 10e of the first insulator 10. As illustrated in FIG. 8C, the claw portions 63h of the second insulator 63 are connected to the flange 61d of the conductor 61. Thus, the second insulator 63 is connected to each of the first insulator 10 and the conductor 61. With such a structure, it is possible to suppress application of a load to a fragile part of the first positive electrode current collector 6a even when a strong impact or vibration is applied to the rectangular secondary battery 20. Thus, it is possible to suppress damage or breakage of a fragile part of the first positive electrode current collector 6a.

The deformable plate 62 is welded to the first positive electrode current collector 6a. Preferably, welding is performed by irradiation with an energy beam such as a laser beam.

Here, the operation of the circuit breaker mechanism 60 will be described. As the pressure in the battery case 100 increases, a central portion of the deformable plate 62 deforms so as to move toward the sealing plate 2 side. When the pressure in the battery case 100 becomes a predetermined pressure or higher, due to the deformation of the deformable plate 62, a notch of a thin portion 6f of the first positive electrode current collector 6a breaks. Thus, the conduction path from the positive electrode plate 4 to the positive electrode terminal 7 is cut. For example, when the rectangular secondary battery 20 becomes overcharged and the pressure in the battery case 100 increases, the circuit breaker mechanism 60 operates to cut the conduction path from the positive electrode plate 4 to the positive electrode terminal 7, thereby preventing further overcharging.

Before welding the deformable plate 62 and the first positive electrode current collector 6a to each other, by supplying a gas to the inside of the conductor 61 through a terminal through-hole 7c formed in the positive electrode terminal 7, it is possible to perform a leakage test of the welded part between the conductor 61 and the deformable plate 62. The terminal through-hole 7c is sealed by a terminal sealing member 7x. Preferably, the terminal sealing member 7x is composed of a metal member and a rubber member.

Figure 10:
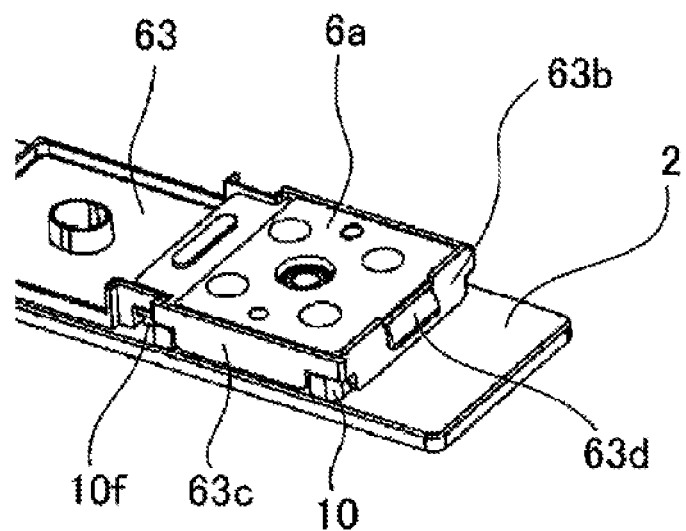
FIG. 10 is a perspective view of the sealing plate to which the components are attached.

FIG. 10 is a perspective view of a surface of the sealing plate 2 that is inside the battery and to which the first insulator 10, the conductor 61, the deformable plate 62, the second insulator 63, and the first positive electrode current collector 6a are attached. As illustrated in FIG. 10, the third connection portion 63d is formed at an end portion of the second insulator 63 in the longitudinal direction of the sealing plate 2. The second connection portions 10f are formed at both ends of the first insulator 10 in the transversal direction of the sealing plate 2.

Attachment of Components to Sealing Plate (Negative Electrode Side)

Figure 11:
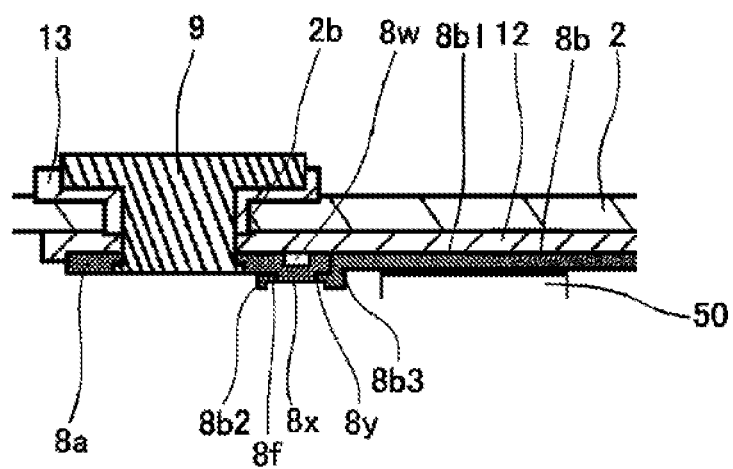
FIG. 11 is a longitudinal sectional view of a portion of the sealing plate near the negative electrode terminal.

Referring to FIGS. 2 and 11, a method of attaching the negative electrode terminal 9 and the first negative electrode current collector 8a to the sealing plate 2 will be described. The first outer insulator 13 is placed on a surface of the sealing plate 2 outside the battery near a negative electrode terminal attachment hole 2b. An inner insulator 12 and the first negative electrode current collector 8a are placed on a surface of the sealing plate 2 inside the battery near the negative electrode terminal attachment hole 2b. Next, the negative electrode terminal 9 is inserted into each of a through-hole of the first outer insulator 13, the negative electrode terminal attachment hole 2b of the sealing plate 2, a through-hole of the inner insulator 12, and a through-hole of the first negative electrode current collector 8a. The tip of the negative electrode terminal 9 is upset on the first negative electrode current collector 8a. Thus, the first outer insulator 13, the sealing plate 2, the inner insulator 12, and the first negative electrode current collector 8a are fixed. Preferably, the upset part of the negative electrode terminal 9 and the first negative electrode current collector 8a are welded to each other by laser welding or the like.

Connection of Current Collector and Tab

Figure 12:
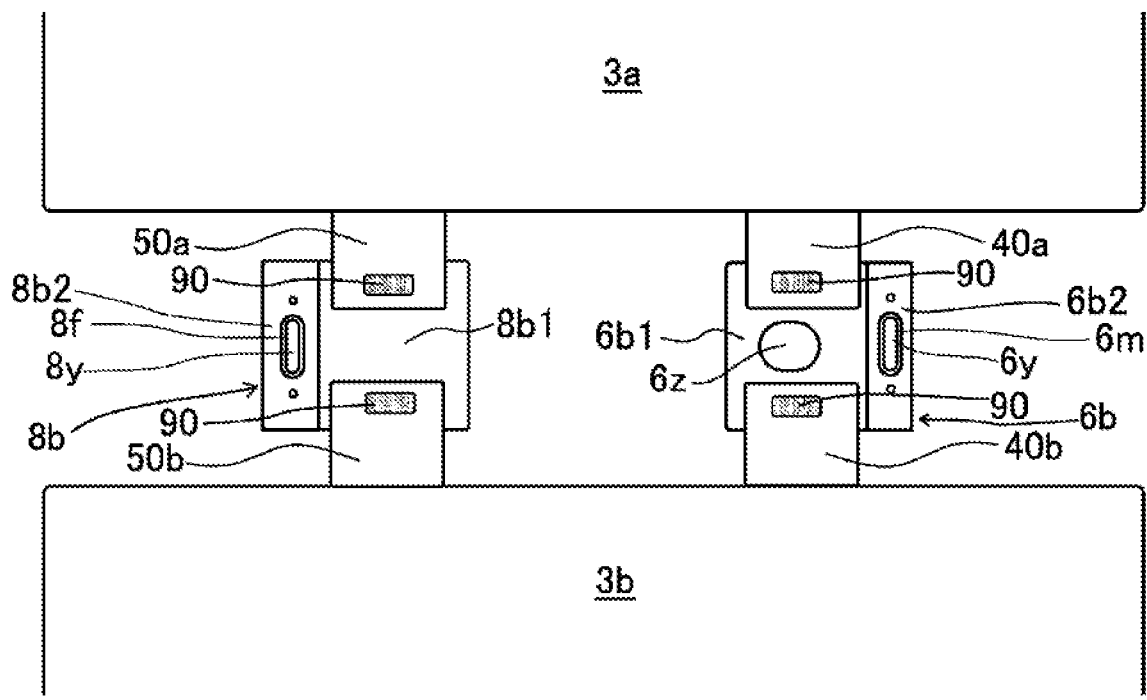
FIG. 12 illustrates a method of attaching tabs to current collector members.

FIG. 12 illustrates a method of connecting the positive electrode tab 40 to the second positive electrode current collector 6b, and a method of connecting the negative electrode tab 50 to the second negative electrode current collector 8b. Two electrode body elements are made by using the methods, and the electrode body elements will be respectively referred to as the first electrode body element 3a and the second electrode body element 3b. The first electrode body element 3a and the second electrode body element 3b may have exactly the same structure or may have different structures. Here, a plurality of positive electrode tabs 40 of the first electrode body element 3a constitute a first positive electrode tab group 40a. A plurality of negative electrode tabs 50 of the first electrode body element 3a constitute a first negative electrode tab group 50a. A plurality of positive electrode tabs 40 of the second electrode body element 3b constitute a second positive electrode tab group 40b. A plurality of negative electrode tabs 50 of the second electrode body element 3b constitute a second negative electrode tab group 50b.

The second positive electrode current collector 6b and the second negative electrode current collector 8b are placed between the first electrode body element 3a and the second electrode body element 3b. Then, the first positive electrode tab group 40a, which is composed of a plurality of positive electrode tabs 40 that are stacked and protrude from the first electrode body element 3a, is placed on the second positive electrode current collector 6b; and the first negative electrode tab group 50a, which is composed of a plurality of negative electrode tabs 50 that are stacked and protrude from the first electrode body element 3a, is placed on the second negative electrode current collector 8b. The second positive electrode tab group 40b, which is composed of a plurality of positive electrode tabs 40 that are stacked and protrude from the second electrode body element 3b, is placed on the second positive electrode current collector 6b; and the second negative electrode tab group 50b, which is composed of a plurality of negative electrode tabs 50 that are stacked and protrude from the second electrode body element 3b, is placed on the second negative electrode current collector 8b. The first positive electrode tab group 40a and the second positive electrode tab group 40b are welded to the second positive electrode current collector 6b, and welds 90 are formed. The first negative electrode tab group 50a and the second negative electrode tab group 50b are each welded to the second negative electrode current collector 8b, and welds 90 are formed.

As illustrated in FIG. 12, the second positive electrode current collector 6b has a current collector first region 6b1 and a current collector second region 6b2. The positive electrode tab 40 is connected to the current collector first region 6b1. The current collector first region 6b1 has a current collector second opening 6z. The current collector first region 6b1 and the current collector second region 6b2 are connected to each other via a current collector third region 6b3. After connecting the second positive electrode current collector 6b to the first positive electrode current collector 6a, the current collector second opening 6z is placed at a position corresponding to the electrolyte injection hole 15 of the sealing plate 2. The current collector second region 6b2 has a current collector first opening 6y. A current collector first recess 6m is formed around the current collector first opening 6y.

As illustrated in FIG. 12, the second negative electrode current collector 8b has a current collector first region 8b1 and a current collector second region 8b2. The negative electrode tab 50 is connected to the current collector first region 8b1. The current collector second region 8b2 has a current collector first opening 8y. A current collector first recess 8f is formed around the current collector first opening 8y.

Connection of First Positive Electrode Current Collector and Second Positive Electrode Current Collector As illustrated in FIG. 8A, and other figures, the second positive electrode current collector 6b is placed on the second insulator 63 so that a current collector protrusion 6x of the first positive electrode current collector 6a is located in the current collector first opening 6y of the second positive electrode current collector 6b. Then, the current collector protrusion 6x of the first positive electrode current collector 6a and the edge of the current collector first opening 6y of the second positive electrode current collector 6b are welded to each other by irradiation of an energy beam such as a laser beam. Thus, the first positive electrode current collector 6a and the second positive electrode current collector 6b are connected.

As illustrated in FIG. 8A, in a direction perpendicular to the sealing plate 2, the distance between the sealing plate 2 and the current collector first region 6b1 is smaller than the distance between the sealing plate 2 and the current collector second region 6b2. With such a structure, the space occupied by the current collector portion can be reduced, and the rectangular secondary battery can have higher volume energy density.

As illustrated in FIG. 8A, a current collector second recess 6w is formed in a surface of the first positive electrode current collector 6a that faces the second insulator 63 and that is on the back side of the current collector protrusion 6x.

Connection of First Negative Electrode Current Collector and Second Negative Electrode Current Collector As illustrated in FIG. 11, the second negative electrode current collector 8b has the current collector first region 8b1 and the current collector second region 8b2. The negative electrode tab 50 is connected to the current collector first region 8b1. The current collector second region 8b2 has the current collector first opening 8y. The current collector first region 8b1 and the current collector second region 8b2 are connected to each other via a current collector third region 8b3.

As illustrated in FIG. 11, the second negative electrode current collector 8b is placed on the inner insulator 12 so that a current collector protrusion 8x of the first negative electrode current collector 8a is located in the current collector first opening 8y of the second negative electrode current collector 8b. Then, the current collector protrusion 8x of the first negative electrode current collector 8a and the edge of the current collector first opening 8y of the second negative electrode current collector 8b are welded to each other by irradiation of an energy bean such as a laser beam. Thus, the first negative electrode current collector 8a and the second negative electrode current collector 8b are connected.

As illustrated in FIG. 11, a current collector second recess 8w is formed in a surface of the first negative electrode current collector 8a that faces the inner insulator 12 and that is on the back side of the current collector protrusion 8x.

The shape of each of the current collector protrusion 6x and the current collector protrusion 8x in plan view is preferably a non-circular shape, and preferably a rectangular shape, an elliptical shape, or an oval-track shape.

Attachment of Cover Portion

After connecting the second positive electrode current collector 6b to the first positive electrode current collector 6a and connecting the second negative electrode current collector 8b to the first negative electrode current collector 8a, and before integrating the first electrode body element 3a and the second electrode body element 3b, preferably, a cover portion 80, which is made of a resin, is connected to the first insulator 10 and the second insulator 63. As illustrated in FIG. 2, in the rectangular secondary battery 20, the cover portion 80 is disposed between the first positive electrode current collector 6a and the electrode body 3. The cover portion 80 is connected to the second connection portions 10f of the first insulator 10 and the third connection portion 63d of the second insulator 63. Preferably, the cover portion 80 is connected to at least one of the first insulator 10 and the second insulator 63.

Making of Electrode Body

The first positive electrode tab group 40a, the second positive electrode tab group 40b, the first negative electrode tab group 50a, and the second negative electrode tab group 50b are bent; and the electrode body 3 is formed by integrating the first electrode body element 3a and the second electrode body element 3b. Preferably, the first electrode body element 3a and the second electrode body element 3b are integrated by using a tape or the like. Alternatively, preferably, the first electrode body element 3a and the second electrode body element 3b are placed in the insulation sheet 14 that has been formed into a box-like shape or a bag-like shape to be integrated. Alternatively, preferably, the first electrode body element 3a and the second electrode body element 3b may be fixed by using an adhesive.

Assembly of Rectangular Secondary Battery

The electrode body 3 is covered with the insulation sheet 14 and inserted into the rectangular casing 1. The sealing plate 2 and the rectangular casing 1 are welded to each other, and the opening of the rectangular casing 1 is sealed with the sealing plate 2. Subsequently, a non-aqueous electrolyte is injected from the electrolyte injection hole 15 of the sealing plate 2, and the electrolyte injection hole is sealed with the sealing plug 16. Thus, the rectangular secondary battery 20 is made.

Regarding Rectangular Secondary Battery 20

As illustrated in FIG. 13A, a surface of the sealing plate 2 inside the battery has a first recess 2c. As illustrated in FIG. 6, a first protrusion 70 protrudes from a part of the second insulator 63 facing the sealing plate 2. In the rectangular secondary battery 20, the first protrusion 70 is disposed in the first recess 2c. Thus, it is possible to suppress movement of the second insulator 63 with respect to the sealing plate 2 in a plane parallel to the sealing plate 2.

The shapes of the first protrusion 70 and the first recess 2c are not particularly limited. Preferably, the shape of the first protrusion 70 is a circular shape, when seen in the direction perpendicular to the sealing plate 2. Preferably, the shape of the first recess 2c is a circular shape, and more preferably an elongated circular shape, when seen in the direction perpendicular to the sealing plate 2.

Preferably, the length of the first recess 2c in the longitudinal direction of the sealing plate 2 is larger than the length of the first recess 2c in the transversal direction of the sealing plate 2, when seen in the direction perpendicular to the sealing plate 2.

The difference between the length of the first recess 2c and the length of the first protrusion 70 in the longitudinal direction of the sealing plate 2 is larger than the difference between the length of the first recess 2c and the length of the first protrusion 70 in the transversal direction of the sealing plate 2. With such a structure, it is possible to suppress movement of the second insulator 63 with respect to the sealing plate 2 in the transversal direction of the sealing plate 2, and to easily attach the second insulator 63 to the sealing plate 2.

Preferably, the first recess 2c is disposed between the gas discharge valve 17 and the electrolyte injection hole 15 in the longitudinal direction of the sealing plate 2. Preferably, the second insulator 63 is connected to another component at a position nearer than the electrolyte injection hole 15 to the positive electrode terminal 7 in the longitudinal direction of the sealing plate 2. With such a structure, because the second insulator 63 is directly or indirectly connected to the sealing plate 2 at a plurality of positions that are further apart, it is possible to more effectively suppress movement of the second insulator 63 with respect to the sealing plate 2 in a plane parallel to the sealing plate 2. In the rectangular secondary battery 20, the second insulator 63 is connected to the first insulator 10 that is fixed to the sealing plate 2. The second insulator 63 is fixed to the conductor 61 that is fixed to the sealing plate 2 with the first insulator 10 and the positive electrode terminal 7 interposed therebetween.

Preferably, the first recess 2c is displaced to a position nearer than the center of the sealing plate 2 to an end portion of the sealing plate 2 in the transversal direction of the sealing plate 2. With such a structure, it is possible to suppress decrease of the strength of the sealing plate 2 even when the sealing plate 2 has the first recess 2c. Therefore, the sealing plate 2 does not deform easily.

In the rectangular secondary battery 20, the second insulator 63 has the insulator first region 63x, which is disposed between the deformable plate 62 and the first positive electrode current collector 6a and which is fixed to the first positive electrode current collector 6a, and the insulator second region 63y, which is disposed on the sealing plate 2. The first protrusion 70 is formed on the insulator second region 63y of the second insulator 63. Therefore, it is possible to suppress application of a load to a fragile part of the circuit breaker mechanism 60 due to movement of the second insulator 63 with respect to the sealing plate 2. It is possible to prevent damage to the first positive electrode tab group 40a or the second positive electrode tab group 40b.

Preferably, the depth of the first recess 2c is 30% to 70% of the thickness of the sealing plate 2 around the first recess 2c. In the transversal direction of the sealing plate 2, the distance from the center of the sealing plate 2 to the first recess 2c is preferably 1/10 or larger, more preferably 1/8 or larger, and further preferably 1/5 or larger of the length of the sealing plate 2.

As illustrated in FIG. 13A, the surface of the sealing plate 2 inside the battery has a second recess 2d. As illustrated in FIG. 6, a second protrusion 71 protrudes from a part of the first insulator 10 facing the sealing plate 2. In the rectangular secondary battery 20, the second protrusion 71 is disposed in the second recess 2d. Thus, it is possible to suppress movement of the first insulator 10 with respect to the sealing plate 2 in a plane parallel to the sealing plate 2.

The shapes of the second protrusion 71 and the second recess 2d are not particularly limited. Preferably, the shape of the second protrusion 71 is a circular shape, when seen in the direction perpendicular to the sealing plate 2. The shape of the second recess 2d is preferably a circular shape, when seen in the direction perpendicular to the sealing plate 2.

Preferably, the second insulator 63, which is disposed between the deformable plate 62 and the first positive electrode current collector 6a and which is fixed to the first positive electrode current collector 6a, is connected to the first insulator 10. In such a case, by disposing the second protrusion 71 of the first insulator 10 in the second recess 2d of the sealing plate 2 to suppress movement of the first insulator 10 with respect to the sealing plate 2, it is possible to more effectively suppress application of a load to a fragile part of the circuit breaker mechanism 60.

Preferably, the second recess 2d is disposed further outward than the positive electrode terminal attachment hole 2a in the longitudinal direction of the sealing plate 2. With such a structure, it is possible to suppress decrease of the strength of the sealing plate 2, compared with a case where the second recess 2d is disposed further inward than the positive electrode terminal attachment hole 2a in the longitudinal direction of the sealing plate 2. Preferably, the second recess 2d is disposed nearer than the center of the sealing plate 2 to an end portion of the sealing plate 2 in the transversal direction of the sealing plate 2. In a case where the first recess 2c is formed in the sealing plate 2, preferably, the first recess 2c is formed on one side of the center of the sealing plate 2 and the second recess 2d is formed on the other side of the center of the sealing plate 2 in the transversal direction of the sealing plate 2.

Preferably, the depth of the second recess 2d is 30% to 70% of the thickness of the sealing plate 2 around the second recess 2d. In the transversal direction of the sealing plate 2, the distance from the center of the sealing plate 2 to the second recess 2d is preferably 1/10 or larger, more preferably 1/8 or larger, and further preferably 1/5 or larger of the length of the sealing plate 2.

As illustrated in FIG. 13A, the surface of the sealing plate 2 inside the battery has a third recess 2e and a fourth recess 2f. A third protrusion and a fourth protrusion protrude from parts of the inner insulator 12, which is disposed between the sealing plate 2 and the second negative electrode current collector 8b, the parts facing the sealing plate 2. The third protrusion is disposed in the third recess 2e, and the fourth protrusion is disposed in the fourth recess 2f. Thus, it is possible to suppress movement of the inner insulator 12 with respect to the sealing plate 2 in a plane parallel to the sealing plate 2.

Preferably, the length of the third recess 2e in the longitudinal direction of the sealing plate 2 is larger than the length of the third recess 2e in the transversal direction of the sealing plate 2, when seen in the direction perpendicular to the sealing plate 2.

Preferably, the difference between the length of the third recess 2e and the length of the third protrusion in the longitudinal direction of the sealing plate 2 is larger than the difference between the length of the third recess 2e and the length of the third protrusion in the transversal direction of the sealing plate 2. With such a structure, it is possible to suppress movement of the inner insulator 12 relative to the sealing plate 2 in the transversal direction of the sealing plate 2, and to easily attach the inner insulator 12 to the sealing plate 2.

Preferably, the third recess 2e is displaced to a position nearer than the center of the sealing plate 2 to an end portion of the sealing plate 2 in the transversal direction of the sealing plate 2. With such a structure, it is possible to suppress decrease of the strength of the sealing plate 2 even when the sealing plate 2 has the third recess 2e.

Preferably, in the transversal direction of the sealing plate 2, the first recess 2c of the sealing plate 2 is located on one side of the center of the sealing plate 2, and the third recess 2e of the sealing plate 2 is located on the other side of the center of the sealing plate 2. With such a structure, it is possible to suppress decrease of the strength of the sealing plate 2.

The circuit breaker mechanism 60 may be omitted, and the positive electrode side may have a structure similar to that of the negative electrode side.

Attachment of Second Outer Insulator (Outer Insulator) and Outer Conductor

The structures of the second outer insulator (outer insulator) and the outer conductor and a method of attaching the second outer insulator and the outer conductor to the rectangular secondary battery 20 will be described by using the positive electrode side as an example. The negative electrode side may have a similar structure, and attachment may be performed by using the same method.

Figure 14:
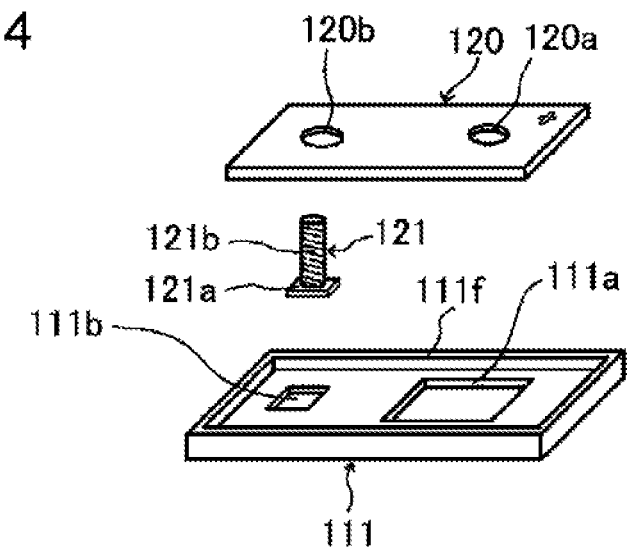
FIG. 14 is a perspective view of an outer conductor, a bolt, and an outer insulator on the positive electrode side.
Figure 15:
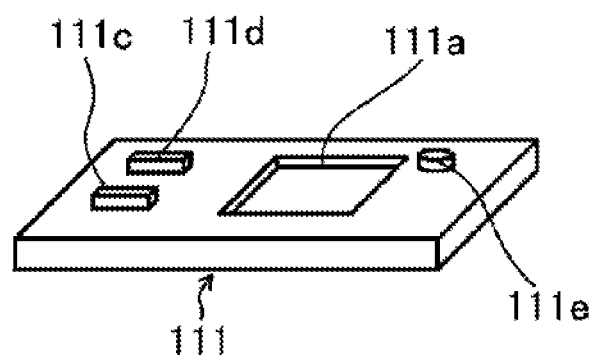
FIG. 15 is a perspective view of the outer insulator in a state in which a surface thereof on the sealing plate side is disposed at an upper position.

FIG. 14 is a perspective view of the second outer insulator 111, the outer conductor 120, and the fastening member 121. FIG. 15 is a perspective view of the second outer insulator 111 in a state in which a surface thereof on the sealing plate side is disposed at an upper position.

The outer conductor 120 is disposed on the sealing plate 2 with the second outer insulator 111 interposed therebetween. The second outer insulator 111 has an outer insulator opening 111a and an outer insulator recess 111b. As illustrated in FIG. 2, when the second outer insulator 111 is disposed on the sealing plate 2, the first outer insulator 11 and the positive electrode terminal 7 are disposed in the outer insulator opening 111a. Preferably, the second outer insulator 111 has a structure that can hold the outer conductor 120. For example, as illustrated in FIG. 14, the second outer insulator 111 preferably has a support wall 111f at the peripheral edge thereof. The second outer insulator 111 may have a holding claw, instead of the support wall 111f or in addition to the support wall 111f.

The outer conductor 120 has a first insertion hole 120a and a second insertion hole 120b. As illustrated in FIG. 2, a connection protrusion 7d of the positive electrode terminal 7 is inserted into the first insertion hole 120a. The positive electrode terminal 7 and the outer conductor 120 can be connected by welding the connection protrusion 7d of the positive electrode terminal 7 and the edge of the first insertion hole 120a to each other. The connection protrusion 7d of the positive electrode terminal 7 may be upset on the outer conductor 120.

The fastening member 121 includes a head 121a and a bolt 121b. The bolt 121b is inserted into the second insertion hole 120b of the outer conductor 120 from the lower side. The head 121a of the fastening member 121 is disposed in the outer insulator recess 111b.

As illustrated in FIG. 15, a first fitting protrusion 111c, a third fitting protrusion 111d, and a second fitting protrusion 111e protrude from a surface of the second outer insulator 111 on the sealing plate 2 side.

As illustrated in FIG. 13B, the surface of the sealing plate 2 outside the battery has a sealing plate recess 102a around the positive electrode terminal attachment hole 2a. The first outer insulator 11 is disposed in the sealing plate recess 102a. A first fitting recess 103a and a third fitting recess 103b are formed at positions nearer than the positive electrode terminal attachment hole 2a to the center of the sealing plate 2 in the longitudinal direction of the sealing plate 2. A second fitting recess 103c is formed at a position further outward than the positive electrode terminal attachment hole 2a in the longitudinal direction of the sealing plate 2.

When the second outer insulator 111 is disposed on the sealing plate 2, the first fitting protrusion 111c and the third fitting protrusion 111d of the second outer insulator 111 are disposed in the first fitting recess 103a and the third fitting recess 103b of the sealing plate 2. The second fitting protrusion 111e of the second outer insulator 111 is disposed in the second fitting recess 103c of the sealing plate 2.

In the rectangular secondary battery 20, the surface of the sealing plate 2 outside the battery has the first fitting recess 103a and the second fitting recess 103c. The first fitting protrusion 111c and the second fitting protrusion 111e of the second outer insulator 111 are respectively disposed in the first fitting recess 103a and the second fitting recess 103c. Therefore, it is possible to suppress displacement of the second outer insulator 111 with respect to the sealing plate 2.

Moreover, in the transversal direction of the sealing plate 2, the first fitting recess 103a is displaced from the center of the sealing plate 2 toward an end portion of the sealing plate 2, and the second fitting recess 103c is displaced from the center of the sealing plate 2 toward an end portion of the sealing plate 2. Therefore, it is possible to suppress decrease of the strength of the sealing plate 2, which may occur if the recesses are concentrated in a central portion of the sealing plate 2 in the transversal direction.

The lengths of the first fitting recess 103a and the third fitting recess 103b in the longitudinal direction of the sealing plate 2 are respectively larger than the lengths of the first fitting recess 103a and the third fitting recess 103b in the transversal direction of the sealing plate 2. The first fitting recess 103a and the third fitting recess 103b each extends in the longitudinal direction of the sealing plate 2. In the transversal direction of the sealing plate 2, the first fitting recess 103a is displaced from the center of the sealing plate 2 toward one side, and the third fitting recess 103b is displaced from the center of the sealing plate 2 toward the other side, with such a structure, it is possible to more effectively suppress displacement of the second outer insulator 111 with respect to the sealing plate 2, and to suppress decrease of the strength of the sealing plate 2. In this case, the second fitting recess 103c may be omitted.

In the transversal direction of the sealing plate 2, the distance from the center of the sealing plate 2 to the first fitting recess 103a and the distance from the center of the sealing plate 2 to the third fitting recess 103b are each preferably 1/10 or larger, more preferably 1/8 or larger, and further preferably 1/5 or larger of the length of the sealing plate 2 in the transversal direction.

In the transversal direction of the sealing plate 2, the distance from the center of the sealing plate 2 to the second fitting recess 103c is preferably 1/10 or larger, more preferably 1/8 or larger, and further preferably 1/5 or larger of the length of the sealing plate 2 in the transversal direction.

Preferably, in the transversal direction of the sealing plate 2, the second fitting recess 103c is displaced from the center of the sealing plate 2 toward one side, and the second recess 2d is displaced from the center of the sealing plate 2 toward the other side.

As illustrated in FIG. 13B, the surface of the sealing plate 2 outside the battery has a sealing plate recess 102b around the negative electrode terminal attachment hole 2b. The first outer insulator 13 is disposed in the sealing plate recess 102b. A first fitting recess 104a and a third fitting recess 104b are formed at positions that are nearer than the negative electrode terminal attachment hole 2b to the center of the sealing plate 2 in the longitudinal direction of the sealing plate 2. A second fitting recess 104c is formed at a position that is further outward than the negative electrode terminal attachment hole 2b in the longitudinal direction of the sealing plate 2. As with the positive electrode side, the first fitting protrusion, the third fitting protrusion, and the second fitting protrusion of the second outer insulator 112 are respectively disposed in the first fitting recess 104a, the third fitting recess 104b, and the second fitting recess 104c.

In the rectangular secondary battery 20, the first recess 2c, the second recess 2d, the third recess 2e, the fourth recess 2f, the first fitting recess 103a, the third fitting recess 103b, the second fitting recess 103c, the first fitting recess 104a, the third fitting recess 104b, and the second fitting recess 104c are each a thin portion having a smaller thickness than other portions.

As illustrated in FIG. 13B, preferably, the sealing plate 2 has a mark that indicates the positive polarity, such as "+", at a position on the sealing plate 2 further outward than the positive electrode terminal attachment hole 2a in the longitudinal direction of the sealing plate 2. Preferably, the sealing plate 2 has a mark that indicates the negative polarity, such as "−", at a position on the sealing plate 2 that is further outward than the negative electrode terminal attachment hole 2b in the longitudinal direction of the sealing plate 2. Thus, a user can correctly recognize the polarities of terminals that are located near the marks.

Preferably, as illustrated in FIG. 14, the outer conductor 120 on the positive electrode side has a mark that indicates the positive polarity, such as "+". Preferably, in the transversal direction of the sealing plate 2, the mark on the sealing plate 2 indicating the positive polarity is displaced from the center of the sealing plate 2 toward one end portion, and the mark on the outer conductor 120 indicating the positive polarity is displaced from the center of the sealing plate 2 toward the other end portion. With such a structure, a user can easily and correctly recognize the polarity of a terminal near the mark from both sides. Preferably, the outer conductor 122 on the negative electrode side has a mark that indicates the negative polarity, such as "−". Preferably, in the transversal direction of the sealing plate 2, the nark on the sealing plate 2 indicating the negative polarity is displaced from the center of the sealing plate 2 toward one end portion, and the mark on the outer conductor 122 indicating the negative polarity is displaced from the center of the sealing plate 2 toward the other end portion. With such a structure, a user can easily and correctly recognize the polarity of a terminal near the mark from both sides. Such a structure is particularly effective in a case where the outer conductor 120 on the positive electrode side and the outer conductor 122 on the negative electrode side are Bade of metals of the same type.

Assembled Battery

An assembled battery can be formed by connecting a plurality of rectangular secondary batteries 20 in series or in parallel. When making the assembled battery, the outer conductor 120 and the outer conductor 122 are used to connect the terminals of adjacent rectangular secondary batteries 20. For example, a busbar, which is made of a metal, is connected to the outer conductor 120 on the positive electrode side of one of adjacent rectangular secondary batteries 20 and to the outer conductor 122 on the negative electrode side of the other of the adjacent rectangular secondary batteries 20. The fastening member 121 and the fastening member 123 are used to connect the busbar to the cuter conductor 120 or the outer conductor 122 by using a nut. The fastening member 121 and the fastening member 123 may be omitted. For example, the busbar may be welded to the outer conductor 120 or the outer conductor 122.

Figure 16:
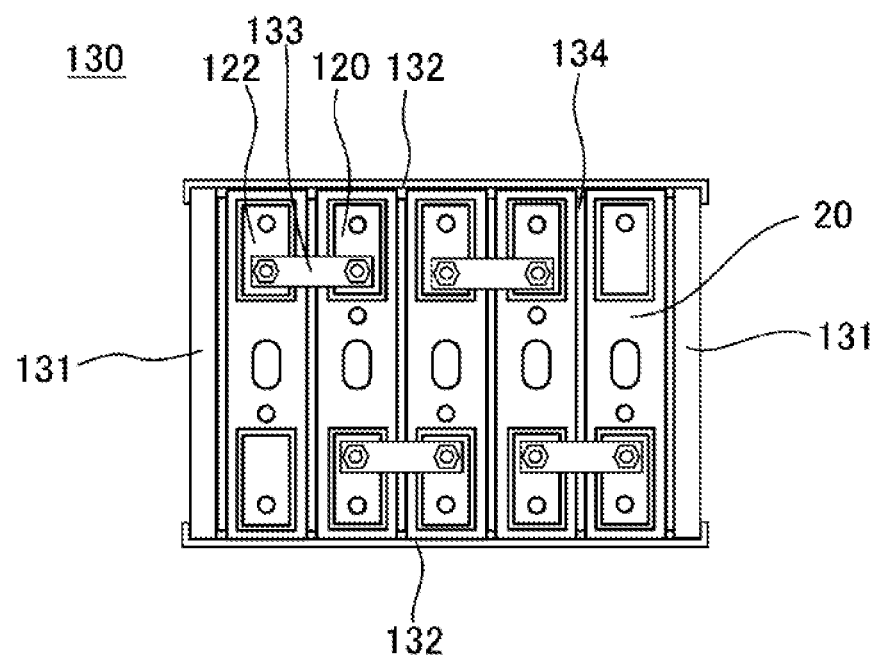
FIG. 16 is a top view of an assembled battery.

FIG. 16 is a top view of an assembled battery 130. Between a pair of end plates 131 made of a metal, a plurality of rectangular secondary batteries 20 are stacked with spacers 134 interposed therebetween. The pair of end plates 131 are connected to each other via a bind bar 132 made of a metal. The outer conductor 120 and the outer conductor 122 of adjacent rectangular secondary batteries 20 are electrically connected to each other via a busbar 133 made of a metal.

Others

The rectangular secondary battery 20 according to the embodiment described above is configured so that the positive electrode terminal 7 and the negative electrode terminal 9 are inserted into the positive electrode terminal attachment hole 2a and the negative electrode terminal attachment hole 2b of the sealing plate 2 from the outside the battery and are upset at positions inside the battery. As a modified embodiment, the positive electrode terminal 7 and the negative electrode terminal 9 may be inserted into the positive electrode terminal attachment hole 2a and the negative electrode terminal attachment hole 2b of the sealing plate 2 from the inside the battery and may be upset at positions outside the battery.

In the rectangular secondary battery 20 according to the embodiment described above, the second outer insulator 111 and the first outer insulator 11 are independent members. However, the second outer insulator 111 and the first outer insulator 11 may be a single member.

Preferably, the first insulator, the second insulator, the cover portion, the first outer insulator, the second outer insulator, and the inner insulator are each made of a resin. Examples of the resin include polypropylene, polyethylene, perfluoroalkoxyalkane (PFA), polytetrafluoroethylene (PTFE), and ethylene-tetrafluoroethylene copolymer (ETFE).

In the embodiment described above, the electrode body 3 is composed of two electrode body elements 3a and 3b. However, this is not a limitation. The electrode body 3 may be a single stacked electrode body. The electrode body 3 may be a single rolled electrode body in which an elongated positive electrode plate and an elongated negative electrode plate are rolled with a separator interposed therebetween. Each of the two electrode body elements 3a and 3b is not limited to a stacked electrode body and may be a rolled electrode body in which an elongated positive electrode plate and an elongated negative electrode plate are rolled with a separator interposed therebetween.

REFERENCE SIGNS LIST

20 . . . rectangular secondary battery 1 . . . rectangular casing 2 . . . sealing plate 2a . . . positive electrode terminal attachment hole 2b . . . negative electrode terminal attachment hole 2c . . . first recess 2d . . . second recess 2e . . . third recess 2f . . . fourth recess 102a . . . sealing plate recess 102b . . . sealing plate recess 103a . . . first fitting recess 103b . . . third fitting recess 103c . . . second fitting recess 104a . . . first fitting recess 104b . . . third fitting recess 104c . . . second fitting recess 100 . . . battery case 3 . . . electrode body 3a . . . first electrode body element 3b . . . second electrode body element 4 . . . positive electrode plate 4a . . . positive electrode core 4b . . . positive electrode active material mixture layer 4d . . . positive electrode protection layer 40 . . . positive electrode tab 40a . . . first positive electrode tab group 40b . . . second positive electrode tab group 5 . . . negative electrode plate 5a . . . negative electrode core 5b . . . negative electrode active material mixture layer 50 . . . negative electrode tab 50a . . . first negative electrode tab group 50b . . . second negative electrode tab group 6 . . . positive electrode current collector member 6a . . . first positive electrode current collector 6c . . . connection hole 6d . . . fixing hole 6d1 . . . small-diameter portion 6d2 . . . large-diameter portion 6e . . . displacement prevention hole 6f . . . third portion 6x . . . current collector protrusion 6w . . . current collector second recess 6b . . . second positive electrode current collector 6b1 . . . current collector first region 6b2 . . . current collector second region 6b3 current collector third region 6m . . . current collector first recess 6y . . . current collector first opening 6z . . . current collector second opening 7 . . . positive electrode terminal 7a . . . flange 7b . . . insertion portion 7c . . . terminal through-hole 7d . . . connection protrusion 7x . . . terminal sealing member 8 . . . negative electrode current collector member 8a . . . first negative electrode current collector 8x . . . current collector protrusion 8w . . . current collector second recess 8b . . . second negative electrode current collector 8b1 . . . current collector first region 8b2 . . . current collector second region 8b3 . . . current collector third region 8f . . . current collector first recess 8y . . . current collector first opening 9 . . . negative electrode terminal 10 . . . first insulator 10a . . . first insulator body 10b . . . first side wall 10c . . . second side wall 10d . . . second terminal insertion hole 10e . . . first connection portion 10f . . . second connection portion 10g . . . recess 10x . . . first groove 10y . . . second groove 11 . . . first outer insulator 11a . . . first terminal insertion hole 12 . . . inner insulator 13 . . . first outer insulator 14 . . . insulation sheet 15 . . . electrolyte injection hole 16 . . . sealing plug 17 . . . gas discharge valve 60 . . . circuit breaker mechanism 61 . . . conductor 61a . . . conductor base portion 61b . . . tubular portion 61c . . . third terminal insertion hole 61d . . . flange 61e . . . pressing protrusion 61f . . . conductor opening 62 . . . deformable plate 63 . . . second insulator 63x . . . insulator first region 63a . . . insulator first opening 63b . . . third wall portion 63c . . . fourth wall portion 63d . . . third connection portion 63e . . . fourth connection portion 63f . . . fixing protrusion 63f1 . . . enlarged-diameter portion 63g . . . displacement prevention protrusion 63h . . . claw portion 63y . . . insulator second region 63i . . . insulator second opening 63k . . . insulator annular rib 63z . . . insulator third region 70 . . . first protrusion 71 . . . second protrusion 80 . . . cover portion 90 . . . weld 111 . . . second outer insulator 111a . . . outer insulator opening 111b . . . outer insulator recess 111c . . . first fitting protrusion 111d . . . third fitting protrusion 111e . . . second fitting protrusion 111f . . . support wall 112 . . . second outer insulator 120 . . . outer conductor 120a . . . first insertion hole 120b . . . second insertion hole 121 . . . fastening member 121a . . . head 121b . . . bolt 122 . . . outer conductor 123 . . . fastening member 130 . . . assembled battery 131 . . . end plate 132-bind bar 133 . . . busbar 134 . . . spacer

The invention claimed is:

1. A rectangular secondary battery comprising: an electrode body that includes a positive electrode plate and a negative electrode plate; a rectangular casing that has an opening and contains the electrode body; a sealing plate that has a first terminal attachment hole and a second terminal attachment hole, and seals the opening; a first terminal that is electrically connected to one of the positive electrode plate and the negative electrode plate and inserted into the first terminal attachment hole; a second terminal that is electrically connected to the other of the positive electrode plate and the negative electrode plate and inserted into the second terminal attachment hole; an outer conductor that is connected to a corresponding one of the first terminal and the second terminal, wherein the outer conductor is disposed on an outer side of the sealing plate opposite an inner side thereof facing the electrode body in a thickness direction of the sealing plate; and an outer insulator that is disposed between the outer conductor and the outer side of the sealing plate, wherein the sealing plate has a first fitting recess and a second fitting recess each formed in the outer side of the sealing plate, wherein in the thickness direction of the sealing plate, each of the first fitting recess and the second fitting recess includes a bottom portion sealing an end portion in each of the first fitting recess and the second fitting recess, wherein a center of the sealing plate is located between the first terminal and the second terminal in a longitudinal direction of the sealing plate, wherein the sealing plate has a first end portion and a second end portion on opposite ends in the longitudinal direction of the sealing plate, and has a third end portion and a fourth end portion on opposite ends in a short direction perpendicular to the longitudinal direction, the first end portion closer to the first terminal attachment hole than to the second terminal attachment hole, and the second end portion closer to the second terminal attachment hole than to the first terminal attachment hole, wherein, in the longitudinal direction of the sealing plate, the first fitting recess is disposed nearer than the first terminal attachment hole to the center of the sealing plate, and the second fitting recess is disposed nearer than the first terminal attachment hole to the first end portion of the sealing plate, wherein in the longitudinal direction of the sealing plate, the first fitting recess is disposed between the center of the sealing plate and the first terminal, wherein, in the short direction of the sealing plate, the first fitting recess has an offset from the center of the sealing plate to the third end portion, and the second fitting recess has an offset from the center of the sealing plate to the fourth end portion, wherein the outer insulator has a first fitting protrusion and a second fitting protrusion, the first fitting protrusion is disposed in the first fitting recess, and the second fitting protrusion is disposed in the second fitting recess, wherein a length of the first fitting recess in the longitudinal direction of the sealing plate is larger than a length of the first fitting recess in the short direction of the sealing plate, and wherein a shape of the second fitting recess in plan view is a circular shape.

2. The rectangular secondary battery according to claim 1, wherein the sealing plate has a third fitting recess, wherein, in the longitudinal direction of the sealing plate, the third fitting recess is disposed nearer than the first terminal attachment hole to the center of the sealing plate, wherein, in the short direction of the sealing plate, the third fitting recess has an offset is from the center of the sealing plate on a side where the first fitting recess is not disposed, wherein in the short direction of the sealing plate, a gap is defined between the third fitting recess and the first fitting recess, and wherein the outer insulator has a third fitting protrusion, and the third fitting protrusion is disposed in the third fitting recess.

3. The rectangular secondary battery according to claim 2, wherein a length of the third fitting recess in the longitudinal direction of the sealing plate is larger than a length of the third fitting recess in the short direction of the sealing plate.

4. An assembled battery comprising a plurality of the rectangular secondary batteries according to claim 1.

5. The rectangular secondary battery according to claim 1, wherein the offset between the first fitting recess and the center of the sealing plate in the short direction is one tenth or more of a dimension of the sealing plate in the short direction.

6. The rectangular secondary battery according to claim 1, wherein the offset between the second fitting recess and the center of the sealing plate in the short direction is one tenth or more of a dimension of the sealing plate in the short direction.

7. The rectangular secondary battery according to claim 1, wherein a first gap between the first fitting recess and the second fitting recess in the longitudinal direction of the sealing plate is larger than a second gap between the first fitting recess and the second fitting recess in the short direction of the sealing plate.

8. The rectangular secondary battery according to claim 1, wherein the sealing plate includes an electrolyte injection hole between the first fitting recess and the center of the sealing plate in the longitudinal direction, and wherein in the longitudinal direction, an end portion of the outer insulator is located between the first fitting recess and the electrolyte injection hole.

9. The rectangular secondary battery according to claim 1, wherein the outer insulator has a support wall at a peripheral edge thereof configured to hold the outer conductor in place.

10. The rectangular secondary battery according to claim 1, wherein the outer insulator has a support wall at a peripheral edge thereof configured to hold the outer conductor in place.

11. A rectangular secondary battery comprising: an electrode body that includes a positive electrode plate and a negative electrode plate; a rectangular casing that has an opening and contains the electrode body; a sealing plate that has a first terminal attachment hole and a second terminal attachment hole, and seals the opening; a first terminal that is electrically connected to one of the positive electrode plate and the negative electrode plate and inserted into the first terminal attachment hole; a second terminal that is electrically connected to the other of the positive electrode plate and the negative electrode plate and inserted into the second terminal attachment hole; an outer conductor that is connected to a corresponding one of the first terminal and the second terminal, wherein the outer conductor is disposed on an outer side of the sealing plate opposite an inner side thereof facing the electrode body in a thickness direction of the sealing plate; and an outer insulator that is disposed between the outer conductor and the outer side of the sealing plate, wherein the sealing plate has a first fitting recess and a second fitting recess each formed in the outer side of the sealing plate, wherein in the thickness direction of the sealing plate, each of the first fitting recess and the second fitting recess includes a bottom portion sealing an end portion in each of the first fitting recess and the second fitting recess, wherein a center of the sealing plate is located between the first terminal and the second terminal in a longitudinal direction of the sealing plate, wherein the sealing plate has a first end portion and a second end portion on opposite ends in the longitudinal direction of the sealing plate, and has a third end portion and a fourth end portion on opposite ends in a short direction perpendicular to the longitudinal direction, the first end portion closer to the first terminal attachment hole than to the second terminal attachment hole, and the second end portion closer to the second terminal attachment hole than to the first terminal attachment hole, wherein, in the longitudinal direction of the sealing plate, the first fitting recess is disposed nearer than the first terminal attachment hole to the center of the sealing plate, and the second fitting recess is disposed nearer than the first terminal attachment hole to the first end portion of the sealing plate, wherein in the longitudinal direction of the sealing plate, the first fitting recess is disposed between the center of the sealing plate and the first terminal, wherein, in the short direction of the sealing plate, the first fitting recess has an offset from the center of the sealing plate to the third end portion, and the second fitting recess has an offset from the center of the sealing plate to the fourth end portion, wherein the outer insulator has a first fitting protrusion and a second fitting protrusion, the first fitting protrusion is disposed in the first fitting recess, and the second fitting protrusion is disposed in the second fitting recess, and wherein a first gap between the first fitting recess and the second fitting recess in the longitudinal direction of the sealing plate is larger than a second gap between the first fitting recess and the second fitting recess in the short direction of the sealing plate.

\* \* \* \* \*